United States Patent [19]

Amalsad et al.

[11] Patent Number: 5,309,580
[45] Date of Patent: May 10, 1994

[54] COMBINATION PORTABLE CHILDREN'S TOILET AND TOILET TRAINER

[75] Inventors: Meher D. Amalsad, 15842 Villanova Cir., Westminster, Calif. 92683; Horace U. Grant, Toluca Lake, Calif.

[73] Assignee: Meher D. Amalsad, Westminster, Calif.

[21] Appl. No.: 931,327

[22] Filed: Aug. 18, 1992

[51] Int. Cl.⁵ ............................................. A47K 11/06
[52] U.S. Cl. ............................................. 4/483; 4/484
[58] Field of Search ................... 4/484, 483, 476, 477, 4/478, 479, 485, 486

[56] References Cited

U.S. PATENT DOCUMENTS

| | | | |
|---|---|---|---|
| 427,627 | 5/1890 | Shepherd | 4/483 |
| 932,592 | 8/1909 | Stein | 4/239 |
| 1,379,374 | 5/1921 | Wagner et al. | 4/483 X |
| 2,127,020 | 8/1938 | Carlson | 4/239 |
| 2,568,322 | 9/1951 | Cunningham | 4/239 |
| 2,893,017 | 7/1959 | Beck | 4/484 |
| 2,940,086 | 6/1960 | Wondrack | 4/239 |
| 3,381,315 | 5/1968 | Glassberg | 4/484 |
| 4,091,475 | 5/1978 | Hewson | 4/321 |
| 5,048,130 | 9/1991 | Brotman et al. | 4/483 |
| 5,155,871 | 10/1992 | Sams | 4/484 |

FOREIGN PATENT DOCUMENTS 0676701 7/1952 United Kingdom ............... 4/484

Primary Examiner—Robert M. Fetsuga

[57] ABSTRACT

A portable compact toilet for infants and toddlers which can be used as an effective "potty" training tool. The toilet includes an apertured seat with four legs pivotally mounted to the underside and foldable into a collapsed position, and a cover pivotally mounted to the seat and securable into a position covering the seat to form a compact package. The cover includes an internal and external storage section for receiving toilet accessories. The internal storage section is received in the seat aperture when the cover is positioned over the seat.

4 Claims, 3 Drawing Sheets

COMBINATION PORTABLE CHILDREN'S TOILET AND TOILET TRAINER

BACKGROUND—FIELD OF INVENTION

Outdoor activities especially traveling with infants and toddlers can become very challenging for parents when toiletry needs are to be met in a moments notice. To add to their frustration, is the fear of potentially transmittable diseases from public toilets. Furthermore, some parents feel very embarrassed to carry with them the conventional bulky potty.

Thus a need has arisen for a truly portable sanitation system for infants and toddlers. This invention can be used in cars, boats, campers, tents, and virtually on any flat surface away from normal sanitation facilities. It can be easily stored and transported. It is light weight and so beautifully designed that when carried on a shoulder it looks like a flying saucer. Specifically, this invention can be used inside and outside of home, thus providing an uninterrupted and consistent potty training at an early age. In general, this invention relates to a compact and light-weight portable toilet for infants and toddlers used for travelling, camping and other recreational purposes.

BACKGROUND—DESCRIPTION OF PRIOR ART

There are no specifically related prior arts that match all the multiple features of this invention. However, the toilet unit having a disposable bag and four legs can be found in Marshall U.S. Pat. No. 676,701; but the pattern of the bag, the design as well as the locking mechanism of the collapsible legs in this invention are unique. Also the disposable bag, storage section, and seat belt can be found in Glassberg U.S. Pat. No. 3,381,315, but in this invention the pattern of the bag, the design of two separate storage sections and the function of the carrying strap acting as a self-adjustable seat belt, are all unique and different. Further, the egg-shaped centered hole in the seat and the contour shape of the seat can be found in the following patents: Stein U.S. Pat. No. 932,592; Carlson U.S. Pat. No. 2,127,020; Cunningham U.S. Pat. No. 2,568,322; Wondrack U.S. Pat. No. 2,940,086 and Hewson U.S. Pat. No. 4,091,475. All of these patents have some visual characteristics of the present invention as related to the egg-shaped centered hole and the contoured curvature of the seating area. Furthermore, Sams U.S. Pat. No. 5,155,871 that is used only with a disposable bag, have similar visual characteristics but this invention can be used with or without a disposable bag specially designed for this invention. Also the distinctive features of this invention related to dual function carrying strap/seat belt, and the separate storage facility for disposable bags as well as for toiletry materials, are not found in Sam's Patent.

OBJECTS AND ADVANTAGES OF THE PRESENT INVENTION

A general object of this invention is to assist parents in the potty training of their small children at an earlier age than usual by providing a toilet which a child can understand and not fear, and can look upon as being its own.

The principal object of the present invention is to provide small children a potty, which is strong in construction, as well as, safe, hygienic, and convenient to use.

A further object of the present invention is to provide a light weight portable potty, yet strong in construction with specially designed legs which pivot and extend out to lock into place providing a safe and sturdy seating arrangement.

A further object of the present invention is to provide a collapsible encapsulated unit which snaps when closed, and uses a dual function adjustable strap which acts as a seat belt when the potty is in the open position and as a carrying strap when it is in the closed position.

A further object of the present invention is to provide a convenient slot located in the inner side of the cover which will house disposable bags.

A still further object of the present invention is to provide a protruding nodule which will serve as a reliable grip for holding the disposable bag in place when the bag is inserted into the egg-shaped centered hole of the seating area. This will further ensure the complete hygienic use of this invention.

A further object of the present invention is to facilitate cleaning, diapering, and other toiletry needs in one package. Because space often is at premium where items are stored, used or carried, special efforts have been made to make this invention as small and compact as possible within permissible limits and without impairing the functions and operations thereof by using the foldable legs. Furthermore, the demands to conserve space have been made concurrently with other demands to reduce costs, and to assure optimum operating integrity, such as to substantially eliminate unwanted splashing unpleasant odors, and to eliminate servicing and cleaning problems.

DESCRIPTION—DRAWING FIGURES

Referenced Numerals:
1. Contour shape of the Seating Portion
2. Egg-shape Centered Hole
3. Open/Close Twisting Snaps
   3A. Bottom halve of Twisting Snap
   3B. Top halve of Twisting Snap
4. Four folding Legs
5. Protruding Nodule
6. Connecting Hinge for Top Cover and Bottom Section of the seat
7. Slots for Carrying Strap/Seat belt
8. Pivot Attachment
9. Self-Adjustable Seat belt/Carrying Strap
10. Connecting Hinge for the External Storage Section of the Cover
11. Open/Close Twisting Snaps for the External Storage Section of the Cover
    11A. Bottom halve of Twisting Snap
    11B. Top halve of Twisting Snap
12. Internal Storage Section on the Cover
13. External Storage Section on the Cover
14. Suction Hole Internal Latching Gripper
15. Open/Close Twisting Snap Type External Latching Gripper
    15A. Bottom halve of External Latching Gripper
    15B. Top halve of External Latching Gripper
16. Reusable Hook-Loop Fastener to secure the folding legs
17. Reusable Hook-Loop Fastener for Self Adjustable Seat Belt/Carrying Strap A more clear understanding of this invention will now be made with the following references to the accompanying drawings which illustrate a number of preferred embodiments of the invention by way of example and in which:

DETAILED DESCRIPTION OF THE PREFERRED EMBODIMENT

Figure 1:
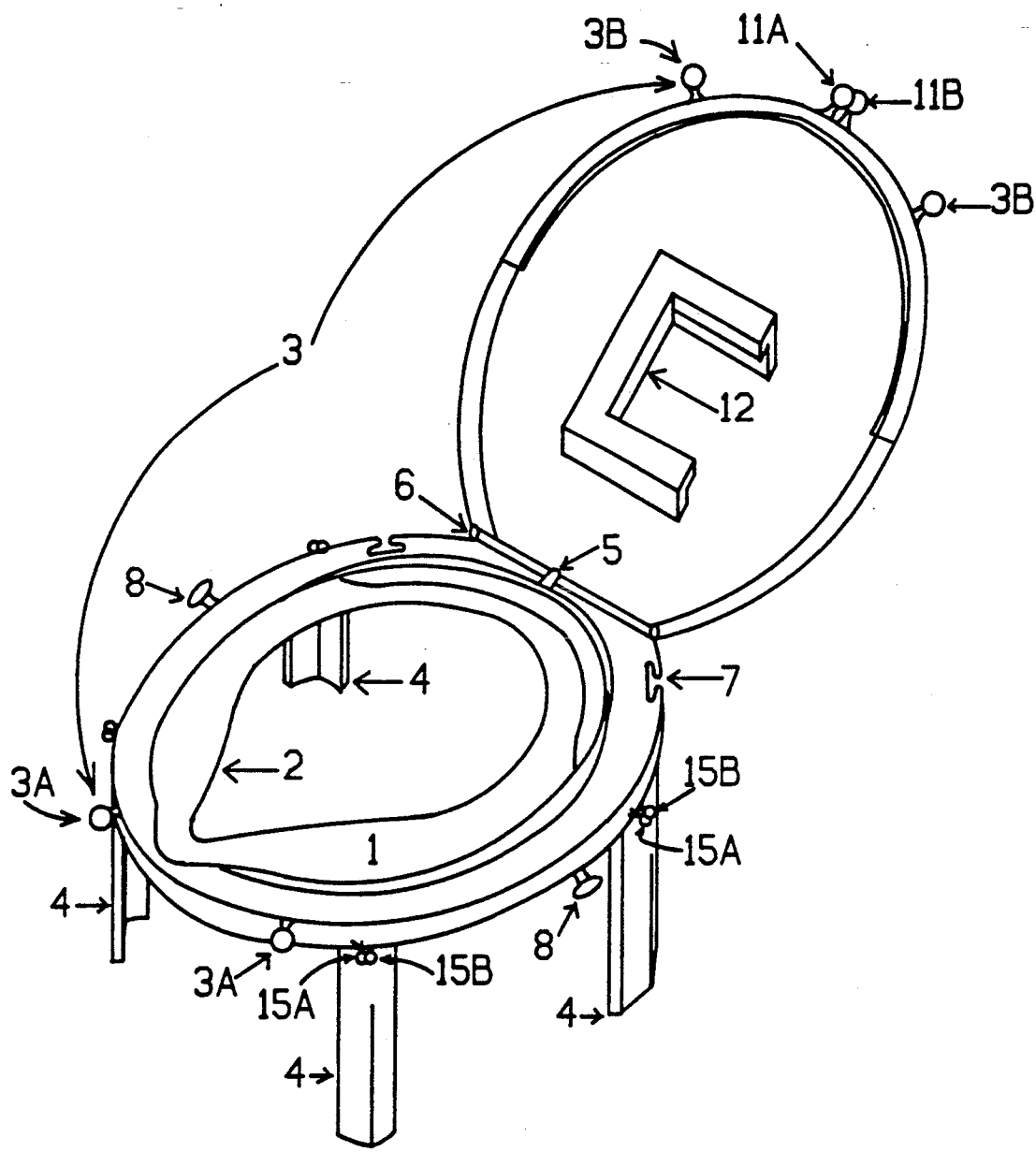
FIG. 1 is a perspective view of the combination portable children's toilet and toilet trainer.

Before explaining the present invention in detail, it is to be understood that this invention is not limited in its application to the details of construction and arrangements of parts illustrated in the accompanying drawings, since the invention is capable of other embodiments and of being practiced or carried out in various ways. Also, it is understood that the phraseology or terminology employed herein is for the purpose of description and not of limitation.

The portable toilet, shown in FIGS. 1-4 includes a seating portion 1. The seating portion with specially designed contours for comfortable seating, comprises of an egg-shaped centered hole 2.

The open/close "twisting snaps" for the top cover and the seat 3A and 3B are used to ensure the ease of opening and closing of the potty, as well as, to provide a reliable gripping mechanism for keeping the potty intact when it is not in use.

Reference numeral 4 depicts the folding legs. For purposes of reliability these legs have two latching grippers when they are in the unfolded position, the suction hole internal latching Gripper 14, and the open/close "twisting snap" type external latching grippers 15A and 15B. Grippers 15A and 15B which serve a two-fold purpose are functionally identical to 3A and 3B respectively, but smaller in size. They will ensure the ease of folding and unfolding of the legs, as well as, provide a reliable gripping mechanism in conjunction with 14 when the potty is in use. When the legs are folded, a reusable hook-loop fastener 16, is used to prevent the legs from opening when potty is not in use.

Figure 2:
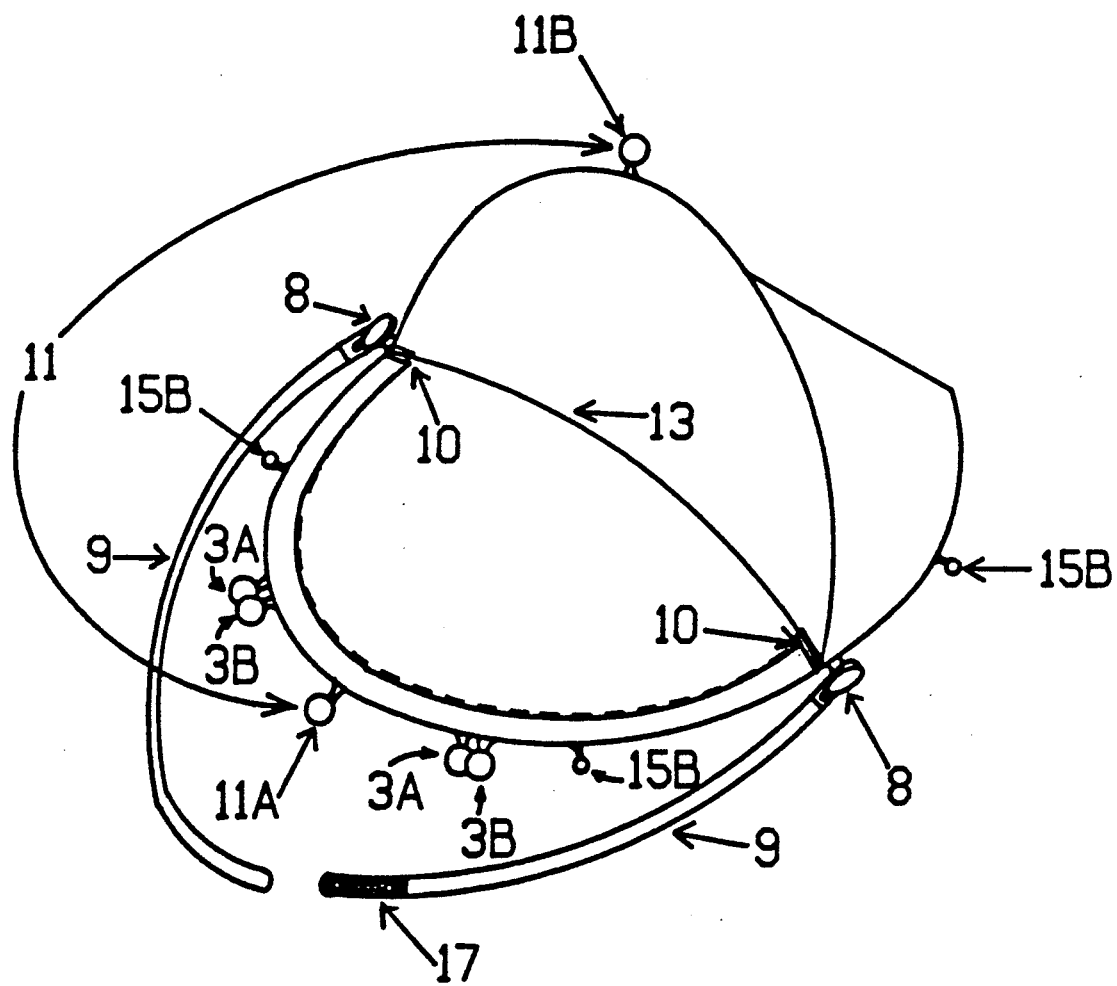
FIG. 2 is a perspective view of the external storage section of the cover, when the cover is in the closed position.
Figures 3, 4:
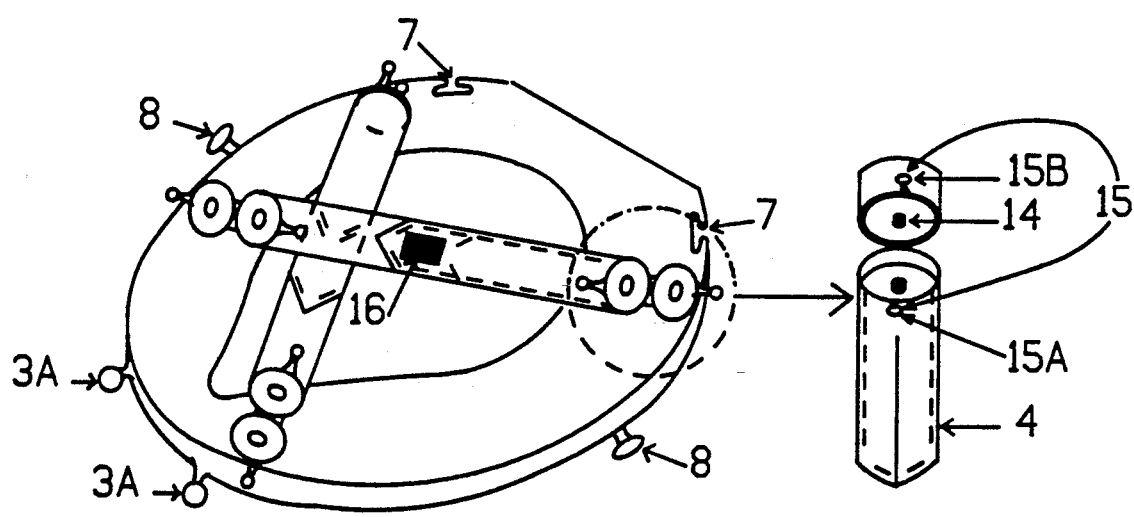
FIG. 3 is the underneath perspective view of the portable toilet with supporting legs in the folded position.
FIG. 4 is the detailed larger scale perspective view of the open and close mechanism for the legs.

In operation when the potty is in its folded state as shown in FIG. 2, it is compact and can be readily stored or carried on a shoulder with a dual purpose self adjustable seat belt/carrying strap 9. To erect the potty, the four folding legs 4 are unfolded downwardly. This will lock all the legs in position by the external latching gripper 15 and the suction hole internal latching gripper 14. The cover is then opened via open/close twisting snaps 3. A specially designed disposable bag, may be used for the child to make the deposit. If the disposable bag is to be used, then the bag is removed from a box located in internal storage section 12 on the cover. The bag is now draped over the contours of the toilet seat 1, and then passed through the egg-shaped centered hole. This defines a hygienic receptacle and the child may make his deposit. Once the deposit is made, the parent can access the external storage section 13 of the cover, for toiletry materials to clean the child, which after cleaning can be thrown in the disposable bag. The storage section 13 is closed and the disposable bag is then removed.

When the potty is in use, the protruding nodule 5 in conjunction with four sets of "twisting snaps" 15A and 15B, provide a reliable grip for holding the disposable bag in place when the bag is inserted into the egg-shaped centered hole. This ensures the complete hygienic use of this invention.

Referenced numeral 6 provides a connecting hinge for the top cover and bottom section of the seating portion. Slots 7 provide an option for the self-adjustable carrying strap 9 to be used as a seat belt. The self-adjustable carrying strap/seat belt is connected to a pivot attachment 8. This strap when passed through Slots 7 can be used as a seat belt after making the desired adjustment.

The self-adjustable seat belt/carrying strap 9, comprises of the belt material with a reusable hook-loop fastener 17. This will cater to a dual purpose. First, it will provide a shoulder carrying mechanism for the potty and second, it will serve as an easily adjustable seat belt when passed through slots 7 and fastened with a reusable hook loop fastener 17.

Reference numeral 10 provides a connecting hinge for the external storage section 13 on the cover, that can be used to store diapers, napkins, and other toiletry materials. This storage section can be accessed by the open/close "twisting snaps" 11A and 11B. Twisting snaps 11A and 11B are identical in size to twisting snaps 3A and 3B respectively and provide the same function.

Reference numeral 12, provides a slot for housing the box of disposable bags.

SUMMARY AND SCOPE OF INVENTION

The present invention provides a unique portable toilet for infants and toddlers that embodies several improved features which overcome inadequacies in other children toilet trainers or toilet seats, while at the same time providing compactness, low cost, lightweight, ease in service, and a convenient, as well as, efficient manner in which it operates.

The present invention provides a circular setting which is comprised of an egg-shaped centered hole with specially designed contours to avoid urine spillage when the child (specially a boy) is seated on the potty.

The present invention provides a combined portable children's toilet with a self-contained carrying case attached to the cover for napkins, diapers, disposable bags and other toiletry materials. The underside of the seating portion contains four perpendicularly aligned legs which lock out when extended, ensuring a safe sitting arrangement, and when folded inwards provide ease in storage, and portability in carrying. The cover connects to the seat and when opened, exposes the seating portion of the potty, as well as, the internal storage section for disposable bags.

The present invention provides a consistent and effective potty training tool by preferably using the specially designed disposable bag.

It is claimed that:

1. A portable compact toilet comprising:
   an apertured seat having an upper surface to support a child and a lower surface;
   a plurality of legs each being pivotally attached to said lower surface of said seat and movable between a folded position adjacent said lower surface for compact portability, and an unfolded position extending downwardly from said lower surface to support said seat on a supporting surface, said legs including means for retaining said legs in said folded position and first means for releasably locking said legs in said unfolded position;

a cover having an inner surface and an outer surface, said cover being hinged at one end to said seat to be movable between an open position with said inner surface spaced from said upper surface of said seat to allow access to said seat, and a closed position with said inner surface superimposed adjacent said upper surface for compact portability, said cover being sized such that said inner surface is coextensive with said upper surface when said cover is in said closed position, said seat and cover including second means for releasably locking said cover in said closed position;

an internal storage section mounted to said inner surface of said cover for receiving toilet accessories, said internal storage section being received in said aperture of said seat when said cover is in said closed position; and an external storage section mounted to said outer surface of said cover for receiving toilet accessories.

2. A portable compact toilet according to claim 1 wherein said first and second locking means comprise twist snaps and said retaining means comprises hook and loop fastening material.

3. A portable compact toilet according to claim 1 wherein said external storage section comprises two hingedly connected portions movable between open and closed positions, said hingedly connected portions being securable in said closed position by twisting snaps.

4. A portable compact toilet according to claim 1 and further comprising a strap connectable to said seat for carrying said toilet and for use as a seat belt.

* * * * *